United States Patent

Campbell et al.

[11] Patent Number: 5,773,072
[45] Date of Patent: Jun. 30, 1998

[54] METHOD OF MAKING A HEAT-STABILIZED OIL/WATER EMULSION CONTAINING EGG YOLK AND DATEM

[75] Inventors: Lydia Campbell, Waldprechts-Weiler-Malsch; Hans Uwe Trueck, Stuttgart, both of Germany

[73] Assignee: Nestec S.A., Vevey, Switzerland

[21] Appl. No.: 563,490

[22] Filed: Nov. 28, 1995

[30] Foreign Application Priority Data

Dec. 13, 1994 [EP] European Pat. Off. ............... 94119664

[51] Int. Cl.⁶ ........................................ A23L 1/39
[52] U.S. Cl. ........................ 426/589; 426/605; 426/613
[58] Field of Search .................... 426/605, 613, 426/589, 614

[56] References Cited

U.S. PATENT DOCUMENTS

| | | |
|---|---|---|
| 3,892,873 | 7/1975 | Kolen ........................ 426/613 |
| 4,140,808 | 2/1979 | Jonson ....................... 426/605 |
| 4,336,272 | 6/1982 | Verreps ...................... 426/605 |
| 4,578,278 | 3/1986 | Giddey ....................... 426/605 |
| 4,794,015 | 12/1988 | Fujita . |
| 4,923,707 | 5/1990 | Schoenberg ............... 426/613 |
| 5,028,447 | 7/1991 | Schenk ....................... 426/605 |
| 5,114,733 | 5/1992 | Qunet ......................... 426/605 |
| 5,160,759 | 11/1992 | Nomura .................... 426/605 |
| 5,213,968 | 5/1993 | Castle et al. . |
| 5,308,639 | 5/1994 | Fung . |
| 5,314,706 | 5/1994 | Colaron et al. . |
| 5,387,428 | 2/1995 | Chapman ................. 426/613 |
| 5,501,869 | 3/1996 | Buliga ....................... 426/603 |

FOREIGN PATENT DOCUMENTS

| | | |
|---|---|---|
| 0141477 | 5/1985 | European Pat. Off. ............... 426/605 |
| 0251020 | 9/1988 | European Pat. Off. . |
| 0558113 | 1/1993 | European Pat. Off. . |
| 0547647 | 6/1993 | European Pat. Off. . |
| 61-209562 | 9/1986 | Japan . |
| 5030906 | 2/1993 | Japan . |
| 1525929 | 9/1978 | United Kingdom . |
| 93/17584 | 9/1993 | WIPO ..................... 426/605 |
| 9317582 | 9/1993 | WIPO . |

*Primary Examiner*—Carolyn Paden
*Attorney, Agent, or Firm*—Vogt & O'Donnell, LLP

[57] ABSTRACT

An emulsion, which provides sauce, dressing, dessert and mayonnaise products which have stability to heat-treatment to effect pasteurization or sterilization, is prepared with an oil, water, egg yolk and a diacetyl tartaric acid ester of monoglycerides (DATEM) and with salt and/or sugar so that, by weight, the oil is in an amount of from 1% to 82%, the egg yolk component is in an amount of from 0.1% to 20% and the DATEM component is in an amount of from 0.1% to 5% (dry weight). To prepare the emulsion, a mixture of egg yolk and DATEM are homogenized, the homogenized mixture is combined with the oil and water and salt and/or sugar ingredients and homogenized to obtain an emulsion. An aroma component also may be combined with the ingredients and for preparing a sauce, a thickener is combined with the ingredients.

15 Claims, No Drawings

METHOD OF MAKING A HEAT-STABILIZED OIL/WATER EMULSION CONTAINING EGG YOLK AND DATEM

BACKGROUND OF THE INVENTION

The present invention relates to oil-in-water food emulsions particularly heat-stable oil-in-water emulsions and their preparation.

Great Britain Patent Specification No. 1,525,929 concerns a water-in-oil emulsion, with phospholipoprotein containing material (for example egg yolk) modified by phospholipase A (PLA). This emulsion is heat-stable, i.e., when exposed for 30 min. to 100° C. Although this emulsion is effectively heat-stable, the great disadvantage is that the egg yolk is enzymatically modified, and secondly, the suppression of any residual activity of PLA by proteases is not possible since the proteolytic enzymes would modify the egg yolk proteins, and PLA alone can only be inactivated at very high temperature (160° C.). Another disadvantage of enzymatically modified egg is that it often has a bitter off taste.

SUMMARY OF THE INVENTION

It has now been found that it is possible to prepare a heat-stable oil-in-water emulsion by using unmodified egg yolk as emulsifying agent, said emulsion having no residual PLA, and by stabilizing the egg yolk and thereby the emulsion with a compound that is neutral in taste and low in price.

The invention provides a heat stable oil-in-water emulsion containing from 1 to 82% oil, from 0.1 to 20% egg yolk, salt and/or sugar, water and 0.1 to 5% diacetyl tartaric acid ester of monoglyceride (referred to as DATEM in this specification) and having a pH of 3 to 8. Herein all percentages are given by weight.

The present invention further provides a process for preparation of an emulsion, including sauces, dressings, mayonnaise and desserts, wherein DATEM and egg yolk are mixed together and homogenized, and water, an edible oil and salt and/or sugar are added to and homogenized with the mixture obtained to obtain an emulsion. Aroma may be added, and a thickener is added for preparation of a sauce. Homogenization of the mixture is carried at high pressure (between 50 and 150 bar), and heat-treatment of the emulsion is carried out by heating the emulsion at a temperature and for a time to at least pasteurize the emulsion.

DESCRIPTION OF THE INVENTION

The type of emulsion product according to the invention is an edible product like sauces, dressings, desserts and mayonnaise. By oil we mean all food grade oils such as soy bean oil, sunflower oil, grapeseed oil, peanut oil, corn oil, butter oil, butter fat and also cream.

In the case of sauces, the emulsion preferably contains from 5 to 70% oil, butter and/or cream. Under the term "sauce", any type of sauce is included, for example, Sauce Hollandaise and Sauce Carbonara.

In the case of dressings, the emulsion contains more water and from 5 to 30% oil.

In the case of mayonnaise, i.e., a product with a high fat content, the product preferably contains from 50 to 82% oil, from 0.1 to 10% vinegar and has a pH of 3 to 5.

In the case of desserts, the emulsion contains from 5 to 50% oil, most preferably around 30% and from 0.1 to 50% sugar. Under the dessert, creme anglaise are more preferably included.

From a general point of view, the emulsion of the present invention is heat-stable, meaning that it can withstand UHT-treatment (less than one min at 140° C.) or sterilization at 110° C. for 10 minutes.

The amount of salt and/or sugar used is preferably from 0.1–3% salt and 0.1–30% sugar. Aromas and ingredients which lead to savoury or sweet products may also be added.

DATEM is obtainable commercially either as a powder or as a paste. In the case of a powder, as paste is made by dissolving 20% powder into 80% water (90° C.) and subsequently cooling.

The egg yolk source is commercially available egg yolk separated from egg white from hen eggs, quails or ostriches stabilised with NaCl (8–10%) or sucrose (20%), or egg yolk in the powdered form. The egg yolk content of the emulsion is preferably between 0.1 and 20%.

The emulsion contains preferably between 0.5 and 1.5% DATEM (dry weight) in the sauce and dressings case and between 0.1 and 3% DATEM (dry weight) in the case of mayonnaise and desserts. A too small amount of DATEM cannot give the required heat-stability.

Concerning now the way of preparation, for the mayonnaise, the emulsion is produced without heat-treatment. For a sauce, a dressing or dessert, the production process includes heat-treatment, such as pasteurization, sterilization or UHT treatment. Except for the sauce, the DATEM can be mixed with all the ingredients in the recipe in one step and sterilized. It is also possible to make an homogenisation after the mixing and before the heat-treatment.

Heat-stability of mayonnaises is tested by heating 10 ml of emulsion in a test tube in a boiling water bath for 30 minutes. Heat-stability of sauces, dressings and desserts is tested by UHT treating (140° C. for 10 sec.) or sterilising (110° C. for 10 min). After cooling, a 100 ml sample is reheated in a microwave oven (650 watt) at maximum setting for 2 min. Alternatively ,500 ml is reheated to boiling point in a glass beaker on a kitchen hot plate. The emulsions are judged visually and emulsions showing oil separation are considered unstable. Structural properties such as roughness and smoothness are determined from the visual appearance of the emulsion. Expert opinion is used.

EXAMPLES

Examples are presented below, and the Examples are presented by way of illustration only.

Example 1

Sauce Hollandaise

For a 60 kg batch of Hollandaise Sauce, 5% egg yolk (9.3% salt) was mixed with 5% water. DATEM paste was added (5%), mixed and homogenised at high pressure. Butter, aroma, salt, sugar, thickener and the rest of the water were added, heated to 50° C., emulsified for 3 min at 3000 rev/min in a batch mixer, homogenised once more at high pressure and UHT treated at 140° C. for 6 seconds. It was cooled to room temperature and it was heat-stable after reheating as described previously.

Example 2

Sauce Carbonara

For a 4 kg batch of Sauce Carbonara, 2.5% DATEM paste was mixed with 3% egg yolk (9.3% salt), meat pieces, salt, thickener, cream and water in a batch mixer. It was subsequently sterilised (110° C. for 20 minutes). It was cooled to room temperature and it was heat-stable after reheating as described previously.

Example 3

Creme Anglaise

For a 100 kg batch of Creme Anglaise, 1% DATEM paste was mixed with 3.75% egg yolk (20% sugar) cream, sugar and water and UHT treated (140° C., 20 seconds). After cooling, the product had an acceptable texture and taste.

We claim:

1. A process for preparing a heat-stable oil and water emulsion sauce which comprises homogenizing a mixture of unmodified egg yolk and of diacetyl tartaric acid ester of monoglyceride ("DATEM") emulsifying agents to obtain a homogenized mixture and combining the homogenized mixture with ingredients comprising an edible oil, water, a thickener component and an ingredient selected from the group consisting of salt and sugar to obtain a further mixture and so that the further mixture comprises, by weight, the oil in an amount of from 5% to 70%, the unmodified egg yolk in an amount of from 0.1% to 20% and the DATEM in an amount of between 0.5% and 1.5% (dry weight) and homogenizing the further mixture to obtain an emulsion which is heat-stable, and then heating the emulsion at a temperature and for a time to at least pasteurize the emulsion to obtain a heat-treated emulsion product.

2. A process according to claim 1 wherein the egg yolk and DATEM mixture is homogenized under a pressure between 50 bar and 150 bar.

3. A process according to claim 2 wherein the ingredients further comprise an aroma component.

4. A process according to claim 2 wherein the emulsion is heated to sterilize the emulsion.

5. A process according to claim 1 wherein the ingredients further comprise an aroma component.

6. A process according to claim 1 wherein the emulsion is heated to sterilize the emulsion.

7. A process according to claim 1 wherein the unmodified egg yolk is unmodified egg yolk stabilized with a substance selected from the group consisting of NaCl and sucrose.

8. A process according to claim 1 wherein the oil comprises an oil selected from the group consisting of oil of butter and of oil of cream.

9. A process according to claim 1 wherein the emulsifying agents consist essentially of the unmodified egg yolk and the DATEM.

10. A process for preparing a heat-stable oil and water emulsion sauce which comprises homogenizing a mixture of unmodified egg yolk and of diacetyl tartaric acid ester of monoglyceride ("DATEM") emulsifying agents to obtain a homogenized mixture and combining the homogenized mixture with ingredients comprising an edible oil, water, a thickener component and an ingredient selected from the group consisting of salt and sugar to obtain a further mixture and so that the further mixture comprises, by weight, the oil in an amount of from 5% to 70%, the unmodified egg yolk in an amount of from 0.1% to 20% and the DATEM in an amount of from 0.1% to 5% (dry weight) and homogenizing the further mixture to obtain an emulsion which is heat-stable, and then heating the emulsion at a temperature and for a time to at least pasteurize the emulsion to obtain a heat-treated emulsion product.

11. A process according to claim 10 wherein the ingredients further comprise an aroma component.

12. A process according to claim 10 wherein the oil comprises a member selected from the group consisting of oil of butter and of oil of cream.

13. A process according to claim 12 wherein the ingredients further comprise an aroma component.

14. A process according to claim 10 wherein the emulsion is heated to sterilize the emulsion.

15. A process according to claim 10 wherein the egg yolk and DATEM mixture is homogenized under a pressure between 50 bar and 150 bar.

* * * * *